United States Patent [19]
Seichter et al.

[11] Patent Number: 5,938,166
[45] Date of Patent: Aug. 17, 1999

[54] VEHICLE REAR VIEW MIRROR COUPLING ASSEMBLY

[75] Inventors: Werner Seichter, Georgensgmünd; Richard Guttenberger, Greding/Obermässing, both of Germany

[73] Assignees: Lang-Mekra North America, Inc., Ridgeway, S.C.; Gebr. Huhler Nachfolger GmbH, Nuremberg, Germany

[21] Appl. No.: 08/955,064

[22] Filed: Oct. 21, 1997

[30] Foreign Application Priority Data

Oct. 29, 1996 [DE] Germany ............................ 196 44 824

[51] Int. Cl.$^6$ ...................................................... A47G 1/24
[52] U.S. Cl. ............................................. 248/479; 359/844
[58] Field of Search ..................................... 248/476, 479, 248/481, 483, 484, 487; 359/198, 214, 844

[56] References Cited

U.S. PATENT DOCUMENTS

| | | | |
|---|---|---|---|
| 2,652,648 | 9/1953 | Morley | 248/483 |
| 3,642,344 | 2/1972 | Corker | 359/214 |
| 3,687,443 | 8/1972 | Anderson | 248/182.1 |
| 4,351,521 | 9/1982 | Erdos | 248/529 |
| 4,555,166 | 11/1985 | Enomoto . | |
| 4,693,571 | 9/1987 | Kimura et al. . | |
| 4,696,555 | 9/1987 | Enomoto | 248/487 |
| 4,764,004 | 8/1988 | Yamada et al. . | |
| 4,818,090 | 4/1989 | Righi . | |
| 4,824,065 | 4/1989 | Manzoni | 248/483 |
| 4,867,408 | 9/1989 | Ozaki . | |
| 5,363,246 | 11/1994 | Perry et al. . | |
| 5,436,769 | 7/1995 | Gilbert et al. | 248/481 |
| 5,568,326 | 10/1996 | Yoshida et al. . | |

OTHER PUBLICATIONS

PCT International Search Report for PCT Appliction No. PCT/EP 97/05908, dated Feb. 20, 1998.

*Primary Examiner*—Ramon O. Ramirez
*Assistant Examiner*—Robert Lipcsik
*Attorney, Agent, or Firm*—Dority & Manning, P.A.

[57] ABSTRACT

A rear view mirror coupling assembly includes a glass carrier for supporting a mirror and including a spherical projection having a first spherical surface and a second spherical surface, a mirror drive housing including a mirror drive mechanism and including a spherical recess having a first surface, a spherical shell disposed between and in contact with the spherical projection and the spherical recess, the spherical shell having a first spherical surface contacting the second spherical surface of the spherical projection and a second spherical surface contacting the first surface of the spherical recess, a threaded bolt having a distal end and a head including a spherical underside surface in contact with the first spherical surface of the glass carrier, a threaded nut threaded onto the distal end of the threaded bolt to secure the glass carrier, the spherical shell, and the mirror drive housing together, and a spring element tensioned by the nut for urging the glass carrier, the spherical shell, and the mirror drive housing together, each of the contacting spherical surfaces being movable along at least one axis relative to the respective contacting spherical surface to provide adjustment of the glass carrier relative to the mirror drive housing.

18 Claims, 4 Drawing Sheets

VEHICLE REAR VIEW MIRROR COUPLING ASSEMBLY

BACKGROUND OF THE INVENTION

The invention concerns a coupling assembly for a pivoting connection of a mirror glass carrier of a rear view mirror of an automotive vehicle, including the housing of a mirror drive, the glass carrier of which is adjustable in two directions at right angles to each other in reference to the stationary housing, and which carrier possesses a spherically shaped projection. Upon the interposition of a spherical shell, the spherically shaped projection engages into a recess of the drive housing, whereby on the spherically shaped recess, guides are provided in the form of mutually corresponding projections and grooves, and a connection element, the head of which is retained in a recess of the mirror glass carrier. The element centrally penetrates the spherical shaped components and the recess, and securely holds same in combination with a spring, the restoring force of which impels the mirror glass carrier against the drive housing.

This coupling assembly is known in common practice. The connection element is a split bolt, the shaft of which is comprised of two springlike side pieces which penetrate the drive housing and possess on their free end externally disposed detent ends which sealingly lie against the outer surface of the drive housing.

In the slot between the two springlike sides of the connection element, there is engaged a spring element in the form of a wire spring, which is supported on both sides of the recess in the mirror glass carrier. This spring element lies against the underside of the head of the connection element and, because of this, exerts a restoration force to move the mirror glass carrier in the direction of the drive housing. At this time, the head of the connection element is without contact with the walls of the recess of the mirror glass carrier.

This known coupling apparatus shows deficiencies. Since the connection between the mirror glass carrier and the drive housing—apart from the adjustment components—is produced by the wire spring alone, the danger exists, that by an impact type loading on the rear view mirror, the wire spring will be bent. Thereby arises at least some play in the coupling apparatus, which leaves the rear view mirror in a questionable operating state. In an unfavorable situation, the rear view mirror could be destroyed. Moreover, the friction between the coupling components of this conventional coupling apparatus is small, which favors disadvantageous vibrations of the rear view mirror. These small frictions exist mainly in that between the head of the connection element and the mirror glass carrier, only a linear contact exists over the wire spring, whereby the combination plastic-to-metal acts to reduce friction. Finally, inexactness in the shape of the spring—as seen from the standpoint of the adjustment movement of the mirror glass carrier—leads to different frictional resistances.

OBJECTS AND SUMMARY OF THE INVENTION

Thus the purpose of the present invention is to create a coupling apparatus for rear view mirrors on motor vehicles which is not susceptible to impact and shock and for which the vibration of the mirror is held as low as possible by increasing the friction of the coupling components, wherein the friction in both adjustment directions of the mirror glass carrier as well as over the entire adjustment distance is of equal proportions.

Using the known coupling apparatus as described in the introduction as a point of departure, the above purpose will be achieved in accord with the invention in that:

a) the connection element is a threaded bolt the free end of which penetrates at least one wall of the drive housing and is provided with a nut, b) contact areas are designed on the underside of the head of the threaded bolt, to lie against the surface of the recess of the mirror glass carrier, c) the surface of the nut which faces the drive housing anchors a first area against the spring element and with a second area against the drive housing, and d) the spring element is arranged on or in the drive housing.

By means of the feature of Item b), the contacting surfaces of the opposing pivoting components are increased in size. The feature of Item d) allots to the spring element alone the function of generating a defined friction force. Acting upon this function through other means, such as retaining methods, frictional surfaces, pivoting axes, and sliding axes, as is done in the case of the conventional coupling apparatus need not be of concern. The feature of Item a), namely the nut coacting with the spring element, brings about the specified degree of frictional force. This is done through bringing the provided contact area on the underside of the head of the threaded bolt against the upper surface of the recess of the mirror glass carrier. With this contact coacting also with the drive housing, the spring amplitude becomes limited. At the same time, assurance is given against damaging reactions from impacts or shocks.

An increase in frictional force is thereby achieved, in accord with a further important feature of the invention, in that the spherical shaped projections of the mirror glass carrier, the spherical shell and the receiver of the drive housing are at least areawise positioned against one another in surface contact.

In a further embodiment of the invention, the threaded bolt exhibits an open slot in the direction of its longitudinal axis which runs to its free end, and which slot is provided with a tapered enlargement, axially extending and opening toward its free end. In this manner, a space is created for the penetration of the spring element and also for the first area of the nut which contacts said spring element. Moreover, the tapered extension upon the insertion of the first area causes an expansion of the threaded bolt, wherein the nut is secured against an undesired loosening.

According to experience, a favorable situation exists when the underside of the head of the threaded bolt is convex, i.e. spherically shaped. In this way, the contact area with the upper surface of the recess in the mirror glass carrier is enlarged. If, in accord with a further feature of the invention, the convex surface is rough finished, a further increase of the frictional force is achieved.

Advantageously, the threaded profile of the threaded bolt is saw-toothed in form. In connection with the above mentioned expanding of the threaded bolt, there arises from this an increased clamping action in the thread section.

In order to assure a sufficient mobility of the mirror glass carrier, it has proved advantageous to allow the shaft area between the head and thread of the threaded bolt to exhibit a lessened diameter. In this way, the penetration opening in the recess of the mirror glass carrier can be held dimensionally small, so that for the contact with the underside of the head of the threaded bolt, sufficient surface is available.

In accord with a further important feature of the invention is that the nut for the free end of the threaded bolt is designed as cap shaped, wherein, a rod axially protrudes from the center of the underside of the cap top. The front side of the rod forms the first zone for abutment against the spring element, while the under edge of the cap supplies the second zone abutment against the drive housing.

In order to achieve the above mentioned expansion of the threaded bolt in a simple manner, in a further embodiment of the invention it has been provided that the rod is tapered in its proximate position to the top of the nut and on to this tapered zone, a cylindrical section is affixed, whereby the tapered zone of the rod shows a slightly larger diameter than the tapered expansion of the slot of the threaded bolt.

Best for practical reasons is to have the threaded bolt and the nut comprised of the same plastic material, but wherein the cap is reinforced with glass fiber. The similarity of the materials increases the frictional force, while the glass fiber reinforcement protects the rod from deformation.

It has be shown as particularly advantageous, when, in accord with further features of the invention, the spring element is designed as a two sided flexion spring in the shape of a straight round wire, which is positioned on the inside of the wall lying opposite to the mirror glass carrier and is laid in two end side receptacles, there being found in front of each said receptacle, a detent and a support as well as a grooved channel for the retention and support of the flexion spring. In this case, the depth of the said grooved channel running underneath the flexion spring increases as the middle of the said spring is approached. The flexion spring penetrates the threaded bolt.

In the case of a preferred embodiment of the invention, the surface area between the guides is partially or fully provided with a rough finish. As mentioned above, thereby a higher friction force is obtained. Upon partial roughening, the recommendation is to not allow the area adjacent to the threaded bolt to be roughened, because this yields the least contribution to frictional force. Beyond this, the penetration of dust and contamination from outside is counter productive. In this direction an additional feature of the invention is aimed, in that the radii of the convex shaped components are so chosen, that indeed the roughened surface areas, not the non-roughened surface areas, contact one another.

In order to combat a negative influence from contamination of the frictional behavior of pivoting surfaces which move against one another, it has been provided, in accord with another advantageous feature of the invention, that the recess of the drive housing possesses a protruding lip on the inner edge of its opening rim.

Additional objects and advantages of the invention will be set forth in part in the following description, or may be obvious from the description, or may be learned from practice of the invention.

BRIEF DESCRIPTION OF THE DRAWINGS

An advantageous embodiment of the invention is shown in the drawings. There is shown in.

DESCRIPTION OF THE PREFERRED EMBODIMENTS

Reference will now be made in detail to the presently preferred embodiments of the invention, one or more examples of which are illustrated int he drawings. Each is provided by way of explanation of the invention, and not meant as a limitation of the invention. For example, features illustrated or described as part of one embodiment can be used on another embodiment to yield yet another embodiment. It is intended that the present invention include such modifications and variations.

Figure 1:
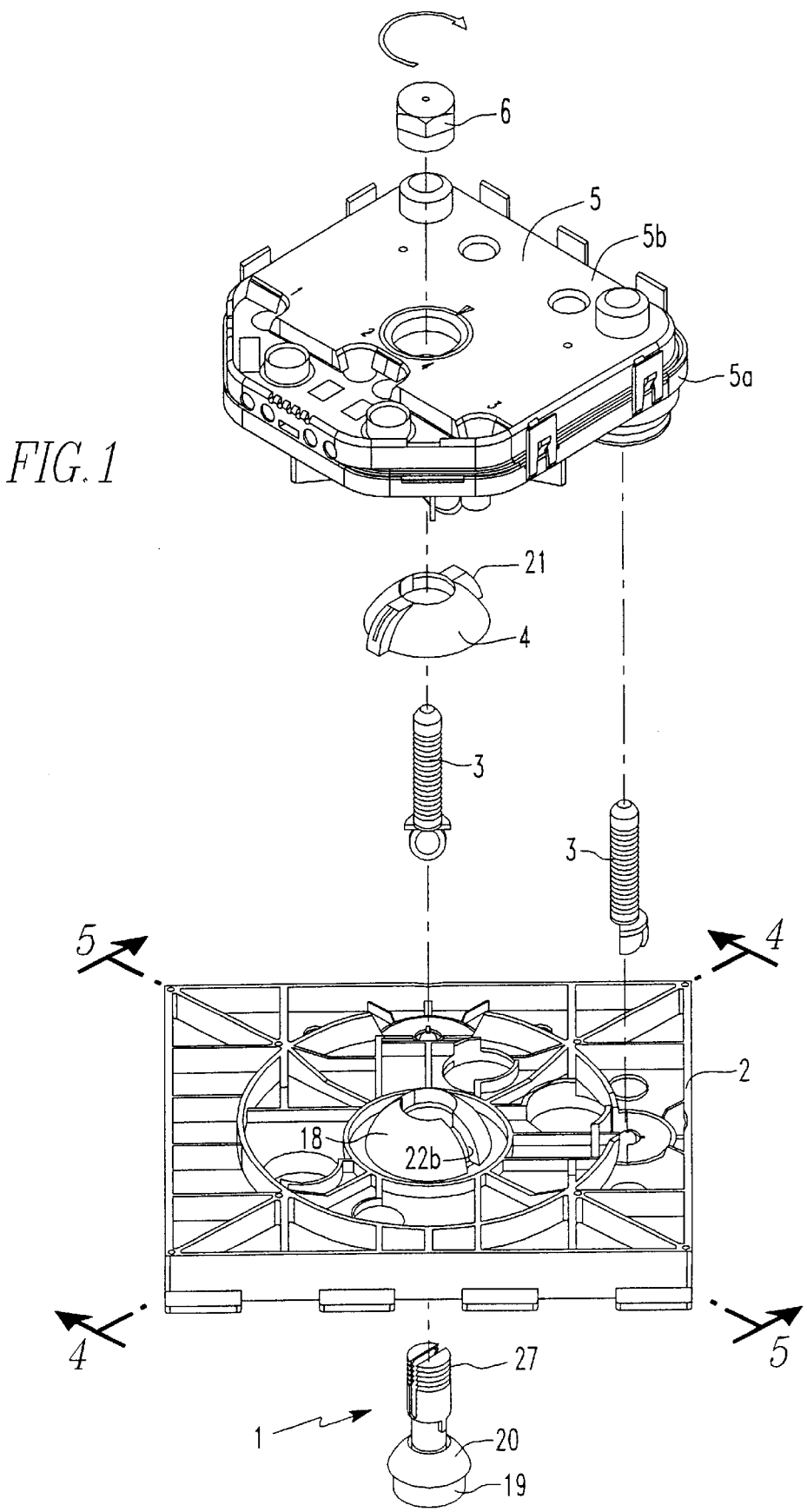
FIG. 1 an exploded perspective view of the coupling assembly of the invention.

FIG. 1 shows, looking from below to above, a threaded bolt 1, a mirror glass carrier 2, two adjustment elements 3, a convex spherical shell 4, a mirror drive housing 5, and a nut 6.

Figure 2:
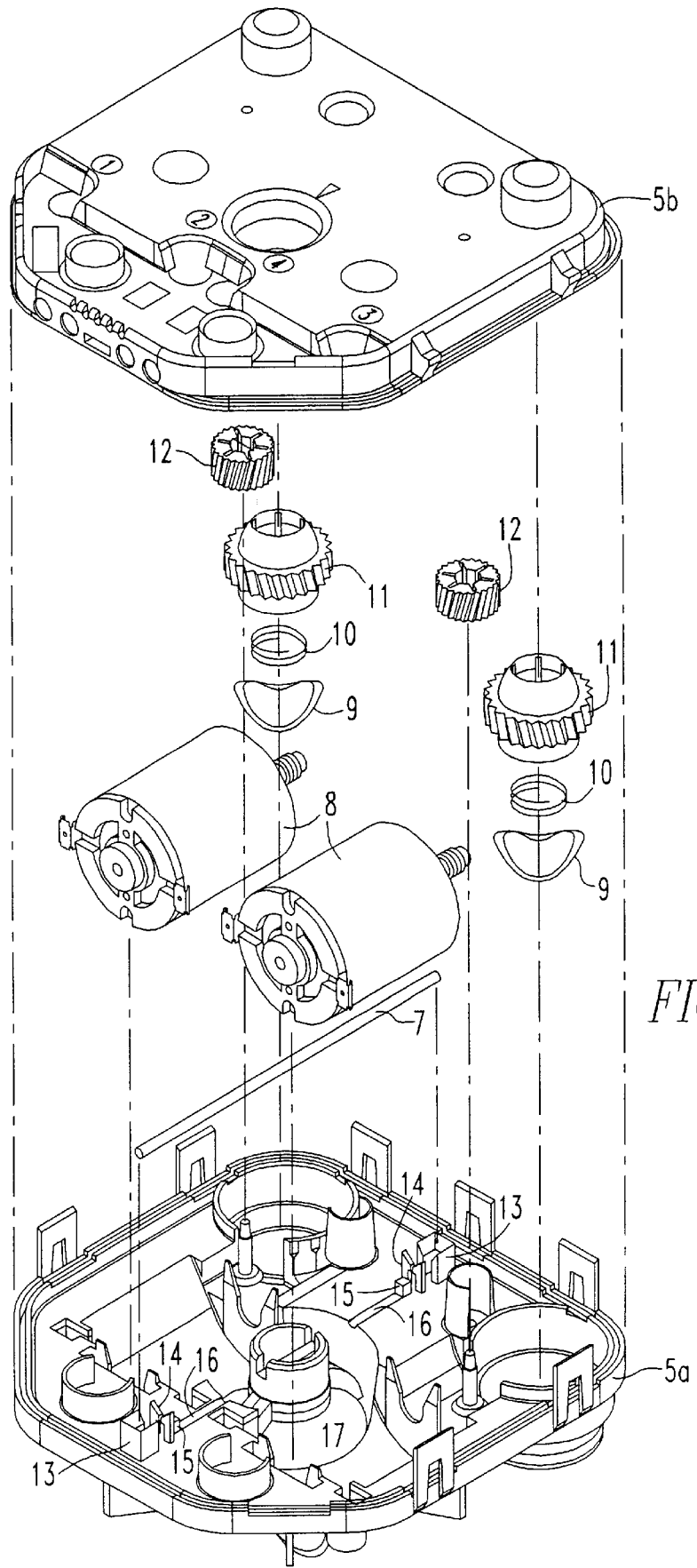
FIG. 2 an exploded perspective view of the drive housing with integral components, FIG. 3 a perspective view of the housing shell which faces the mirror glass carrier, FIG. 4 a partial section view through the coupling assembly of the invention taken along line 4—4 in FIG. 1, and FIG. 5 a partial section view at right angles to the view of FIG. 4 taken along line 5—5 in FIG. 1.
Figure 3:
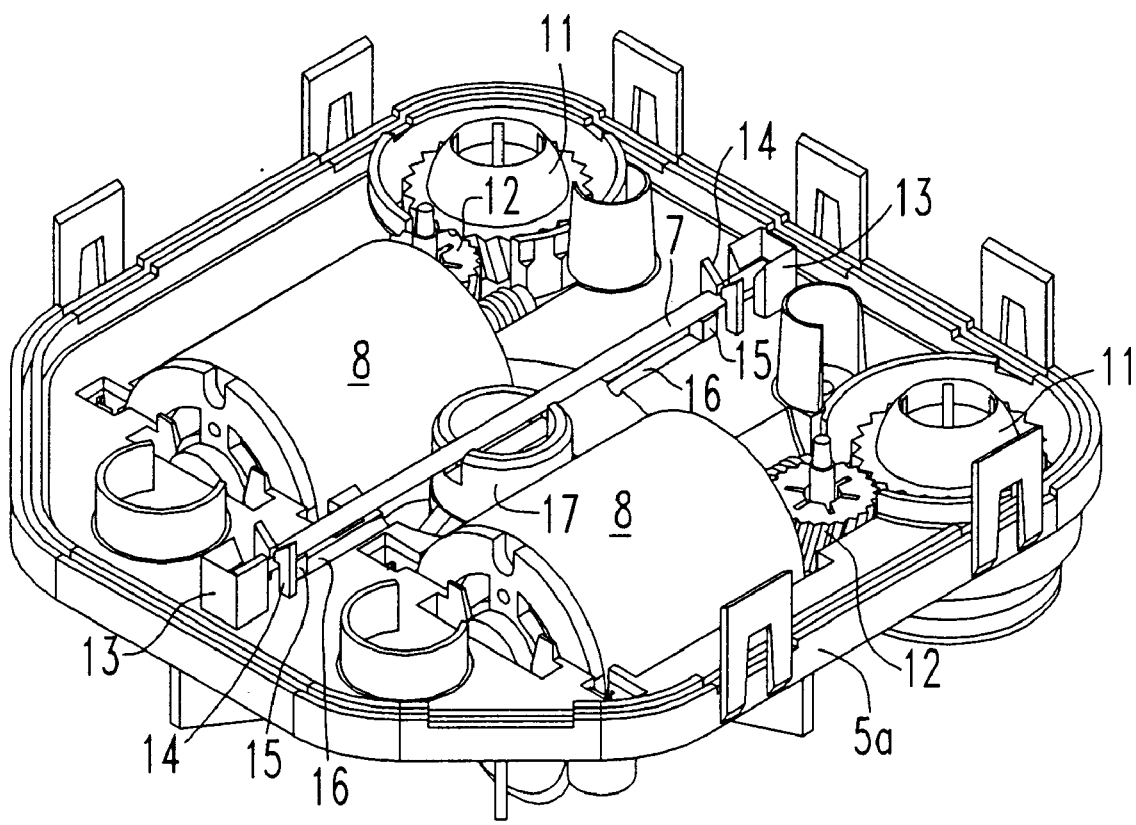

In FIG. 2, again looking from below to above, a housing part 5a, a flexion spring 7, two drive motors 8, two shaft rings 9, two coiled spring rings 10, two drive gears 11, two idler gears 12, and a second housing part 5b. The flexion spring 7 runs between the two drive motors 8, parallel to the longitudinal axes thereof, as shown in FIG. 3. One end of the spring is laid in a receptacle 13, before which a detent 14, a support 15 as well as a grooved channel 16 is found. The channel 16 continues on to a centering and securing fitting 17.

Figure 4:
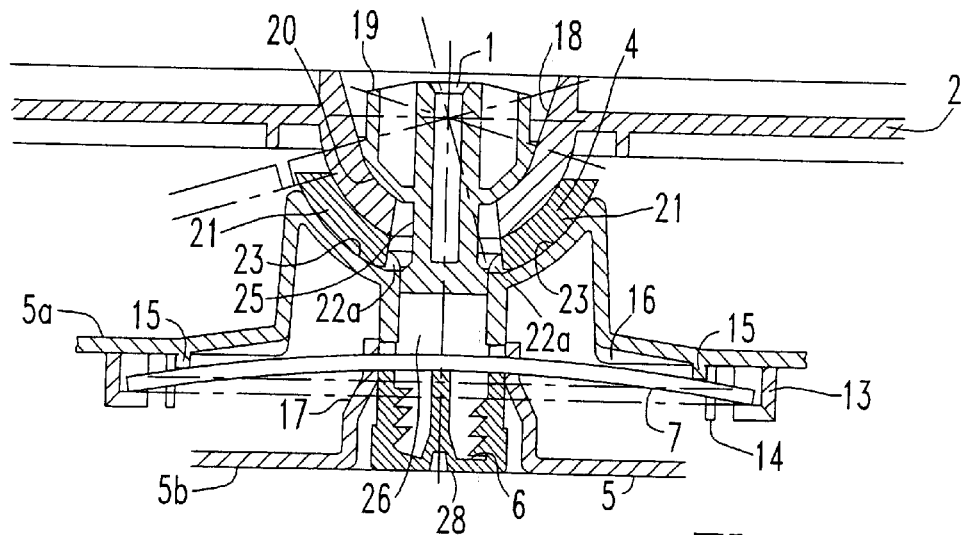
Figure 5:
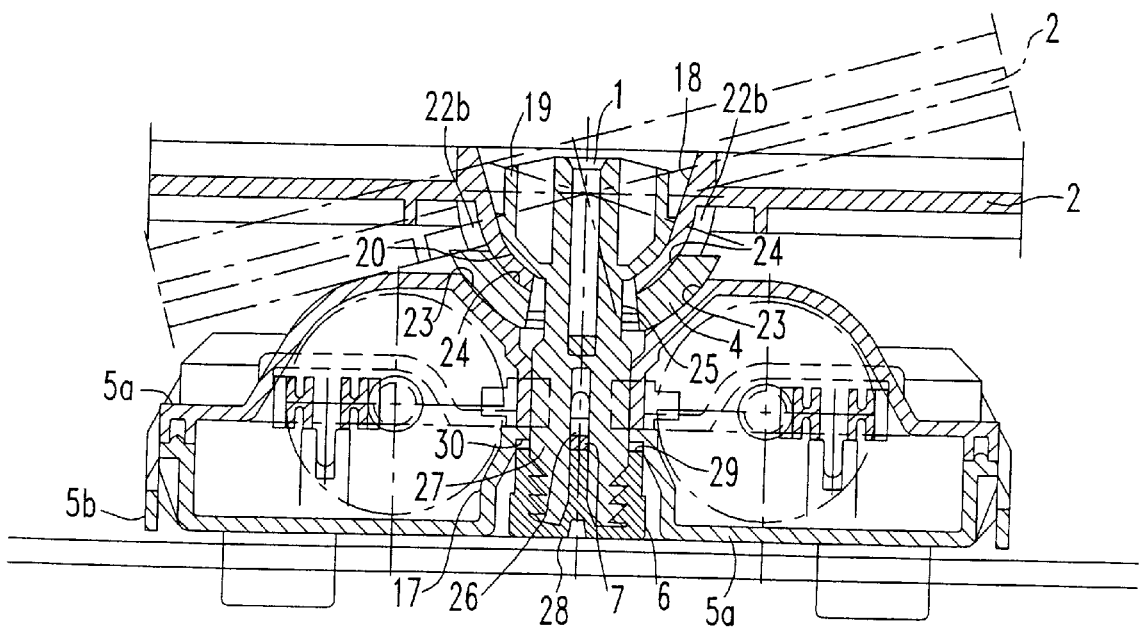

The sectional views of FIGS. 4 and 5, show the mirror glass carrier 2 with a recess 18, into which the head 19 of the threaded bolt 1 is placed, which head possesses on its underside a spherical surface 20, the full surface of which lies against the inner surface of the recess 18. Beneath the said recess 18 is recognized the spherical shell 4, which lies with its full surface against the outer surface of recess 18. The spherical shell 4 is shown in FIG. 4 with external projections 21 which engage in corresponding grooves 22a of a provided recess 23 in the housing part 5a. In FIG. 5, spherical shell 4 engages with inner projections 24 into the corresponding grooves 22b of the recess 18. The recess 18 and the spherical shell 4 are penetrated, with radial play, by a non-threaded, diminishing cross-sectional area 25 of the threaded bolt 1.

In connection at the area 25, the threaded bolt 1 exhibits a slot 26 located along a longitudinal middle plane, remaining open to the free end of the threaded bolt 1 and is provided with an axially extending tapered expansion. The free end of the threaded bolt 1 possesses a saw toothed thread.

The flexion spring 7 penetrates through the slot 26 of the threaded bolt 1. This is loaded by a pin 28 in the direction of the mirror glass carrier 2. The pin 28 arises from the center of the cap top of the nut 6. The lower circumferential edge 29 of the nut 6 is held, in the presented fully screwed up position, at a spatial interval from a detent surface or stop 30 of the drive housing 5. The edge 29 can come into contact briefly with the detent surface 30 only by impact or shock action on the rear view mirror. The interval between the lower circumferential edge 29 and the detent surface 30 is so measured, that the flexion spring 7 can simply be flexed within the elastic zone.

It will be apparent to those skilled in the art that various modifications and variations can be made in the present invention without departing from the scope and spirit of the invention. It is intended that the present invention include such modifications and variations as come within the scope of the appended claims and their equivalents.

We claim:

1. A rear view mirror coupling assembly comprising:
   a glass carrier for supporting a mirror and including a spherical projection having a first spherical surface and a second spherical surface;
   a mirror drive housing including a mirror drive mechanism and including a spherical recess having a first surface;

a spherical shell disposed between and in contact with the spherical projection and the spherical recess, the spherical shell having a first spherical surface contacting the second spherical surface of the spherical projection and a second spherical surface contacting the first surface of the spherical recess of the mirror drive housing;

a threaded bolt having a distal end and a head including a spherical underside surface in contact with the first spherical surface of the glass carrier;

a threaded nut threaded onto the distal end of the threaded bolt to secure the glass carrier, the spherical shell, and the mirror drive housing together; and a spring element disposed in the mirror drive housing and tensioned by the nut for urging the glass carrier, the spherical shell, and the mirror drive housing together, each of the contacting spherical surfaces being movable along at least one axis relative to the respective contacting spherical surface to provide adjustment of the glass carrier relative to the mirror drive housing.

2. The assembly of claim 1, wherein the spring element is a flexion spring.

3. The assembly of claim 2, wherein the threaded bolt defines a slot therein, the flexion spring extending through the slot.

4. The assembly of claim 3, wherein the threaded nut includes a pin that extends into the slot to contact and tension the flexion spring.

5. The assembly of claim 4, wherein the threaded nut includes an edge, and wherein the mirror drive housing includes a stop, movement of the glass carrier in an axial direction of the threaded bolt away from the mirror drive housing causing the edge of the nut to contact the stop precluding further movement of the glass carrier in the axial direction.

6. The assembly of claim 5, wherein the edge of the nut is spaced from the stop unless the glass carrier is moved in the axial direction.

7. The assembly of claim 1, wherein the second spherical surface of the spherical shell includes first projections disposed within grooves defined within the first spherical surface of the spherical recess of the mirror drive housing.

8. The assembly of claim 7, wherein the second spherical surface of the glass carrier defines grooves for receiving second projections extending from the first spherical surface of the spherical shell.

9. The assembly of claim 8, wherein the first projections are disposed perpendicular from the second projections.

10. The assembly of claim 1, wherein the bolt includes a threaded portion that increases in diameter toward the distal end.

11. The assembly of claim 1, wherein the bolt includes a portion of reduced diameter between the head and the threaded portion.

12. The assembly of claim 1, wherein the threaded bolt and nut both include the same plastic material, and the nut further includes reinforcing glass fibers.

13. The assembly of claim 1, wherein the mirror drive housing includes two housing portions defining an inside area, and the spring element is disposed between the two housing portions in the inside area.

14. A rear view mirror coupling assembly comprising:

a glass carrier for supporting a mirror and including a spherical projection having a first spherical surface and a second spherical surface;

a mirror drive housing including a mirror drive mechanism and including a spherical recess having a first surface;

a spherical shell disposed between and in contact with the spherical projection and the spherical recess, the spherical shell having a first spherical surface contacting the second spherical surface of the spherical projection and a second spherical surface contacting the first surface of the spherical recess;

a threaded bolt having a distal end and a head including a spherical underside surface in contact with the first spherical surface of the glass carrier;

a threaded nut threaded onto the distal end of the threaded bolt to secure the glass carrier, the spherical shell, and the mirror drive housing together, the threaded nut including an edge and the mirror drive housing including a stop, movement of the glass carrier in an axial direction of the threaded bolt away from the mirror drive housing causing the edge of the nut to contact the stop precluding further movement of the glass carrier in the axial direction; and a spring element disposed in the mirror drive housing and tensioned by the nut for urging the glass carrier, the spherical shell, and the mirror drive housing together, each of the contacting spherical surfaces being movable along at least one axis relative to the respective contacting spherical surface to provide adjustment of the glass carrier relative to the mirror drive housing.

15. The assembly of claim 14, wherein the bolt includes a threaded portion that increases in diameter toward the distal end.

16. The assembly of claim 14, wherein the bolt includes a portion of reduced diameter between the head and the threaded portion.

17. The assembly of claim 14, wherein the threaded bolt and nut both include the same plastic material, and the nut further includes reinforcing glass fibers.

18. The assembly of claim 14, wherein the mirror drive housing includes two housing portions defining an inside area, and the spring element is disposed between the two housing portions in the inside area.

* * * * *